United States Patent

Moon et al.

Patent Number: 6,138,146
Date of Patent: Oct. 24, 2000

[54] ELECTRONIC MAIL FORWARDING SYSTEM AND METHOD

[75] Inventors: Billy G. Moon, Apex; Tammy A. Wooldridge, Raleigh, both of N.C.

[73] Assignee: Ericsson Inc., Research Triangle Park, N.C.

[21] Appl. No.: 08/940,089

[22] Filed: Sep. 29, 1997

[51] Int. Cl.[7] .............................. G06F 15/00; G06F 13/00
[52] U.S. Cl. ........................ 709/206; 709/207; 709/240; 709/245
[58] Field of Search .................................... 709/206, 207, 709/240, 245; 379/93.24, 100.08; 370/392, 393, 474, 475

[56] References Cited

U.S. PATENT DOCUMENTS

| | | |
|---|---|---|
| 5,265,033 | 11/1993 | Vajk et al. . |
| 5,712,907 | 1/1998 | Wegner et al. . |
| 5,790,809 | 8/1998 | Holmes .................................... 709/206 |
| 5,838,685 | 11/1998 | Hochman . |
| 5,844,969 | 12/1998 | Goldman et al. ..................... 379/93.24 |

OTHER PUBLICATIONS

Hilal et al., "Designing large electronic mail systems", Distributed Computing Systems, 1988., 8th International Conference, pp. 402–409, Jun. 1988.

Giencke, P., "The future of email or when will Grandma be on the net?", Electro/95 International. Professional Program Proceedings., pp. 61–67, Jun. 1995.

Stern, R.H., "AOL: essential for sending junk e-mail?", IEEE Micro, pp. 7–8, Mar. 1997.

*Primary Examiner*—Zarni Maung
*Assistant Examiner*—Almari Romero
*Attorney, Agent, or Firm*—Wood, Phillips, VanSanten, Clark & Mortimer

[57] ABSTRACT

A mail forwarding system is provided for use in a private network system having a server, a fixed computer and a router for connection to a public network external to the private network, all interconnected via a data connection, with the server controlling electronic mail resources addressed to a user of the fixed computer received by the private network. The mail forwarding system includes a mail forwarding program operating in the fixed computer for controlling the fixed computer to selectively (a) retrieve electronic mail addressed to the user of the fixed computer from the private network and (b) transmit the received electronic mail via the router to an assigned address in the public network accessible by a communicator remote from the private network.

18 Claims, 7 Drawing Sheets

ELECTRONIC MAIL FORWARDING SYSTEM AND METHOD

FIELD OF THE INVENTION

The present invention is directed toward electronic mail resources and, more particularly, to a mail forwarding system and method for forwarding electronic mail received in one network to a predetermined location in another network.

BACKGROUND OF THE INVENTION

In today's business world, communications via electronic mail resources are becoming increasingly popular. One such electronic mail resource is generally known as E-mail. Communications via E-mail may occur between two persons within a private network system, or between one person in the private network and another person outside the private network. It should be understood that while the present invention will be described with reference to receiving and transmitting E-mail, other electronic mail resources are also contemplated for use with the present invention, such as but not limited to, fax, voice and video mail.

The term "private network" generally refers to any private network generally nonaccessible to the public at large, such as used by a business, corporation, university, government agency, church, charitable organization, etc. The private network may comprise a local area network including a plurality of personal computers, a private server and a firewall router, all interconnected via a data connection. The private network may also include a branch-office router for connection to a wide area network.

The private server controls all electronic mail resources which are sent or received in the private network. E-mail communications are readily transmittable between the personal computers within the private network. E-mail communications outside the private network generally occur through the firewall router which connects the private network with the Internet or some other public network.

All E-mail destined to a person within the private network is stored in the private server at the assigned address or "mailbox" of the intended recipient. Often times, a person who is away from the private network, such as a business person who is away from the office, will want to access the private server to check for any E-mail messages. Such a person will hereinafter be referred to as a "Travelling Business Person" or "TBP".

Generally, the TBP can access the private server through a dial up Public Switch Telephone Network ("PSTN") connection, or alternatively, from the Internet or other public network through the firewall router. Problems arise when the TBP is unable to access the private server via the Internet due to various network restrictions which may be placed on such connections by the business or corporation. The PSTN connection may require a long distance call.

An option has been to designate an address in a network external to the private network generally accessible to the public, i.e., a public mailbox resident in a public server, where E-mail messages are to be sent. However, this option lacks security in that the E-mail, while sitting at the public mailbox, may be improperly accessed and viewed and/or stolen by a non-intended party. Further, this option generally provides limited connectivity to internal corporate messages.

Often, a TBP would have a private or corporate mailbox in the private server and a personal mailbox in the public server. For convenience purposes, the TBP would normally want to keep corporate messages separate from personal messages. A way of accomplishing this is to have all corporate mail sent to the corporate mailbox. By providing both a personal and a corporate mailbox address, a TBP is unaware of where important corporate messages may be stored, and would thus have to check both mailboxes for messages, which may result in wasted time and money. Further, the addition of a personal mailbox address also increases the number of E-mail addresses that the TBP's correspondents must deal with.

The present invention is directed toward overcoming one or more of the above-mentioned problems.

SUMMARY OF THE INVENTION

A mail forwarding system is provided for use in a private network having a server, a fixed computer and a router for connection to a public network external to the private network, all interconnected via a data connection, with the server controlling electronic mail resources when electronic mail addressed to a user of the fixed computer is received by the private network. The mail forwarding system includes a mail forwarding program operating in the fixed computer for controlling the fixed computer to selectively (a) retrieve electronic mail addressed to the user of the fixed computer from the private network and (b) transmit the received electronic mail via the router to an assigned address in the public network accessible by a communicator remote to the private network.

In one aspect of the present invention, the mail forwarding program includes a comparison routine which controls the fixed computer to transmit only selected pieces of electronic mail meeting certain criteria. The fixed computer determines whether the retrieved electronic mail meets the certain criteria. If the retrieved electronic mail meets the certain criteria, the fixed computer transmits the retrieved electronic mail to the assigned address via the router. On the other hand, if the retrieved electronic mail does not meet the certain criteria, the fixed computer transmits the retrieved electronic mail back to the server via the data connection.

In another aspect of the present invention, the comparison routine is accessible to input and/or change the certain criteria only by a user at the fixed computer.

In another aspect of the present invention, the mail forwarding program includes a timing routine which controls the fixed computer to retrieve and transmit electronic mail at a selected time.

In another aspect of the present invention, the timing routine is accessible to input and/or change the selected time only by a user at the fixed computer.

In another aspect of the present invention, the mail forwarding program controls the fixed computer to encrypt the retrieved electronic mail prior to transmitting it to the assigned address.

In another aspect of the present invention, the mail forwarding program includes an address programming routine which is accessible to input and/or change the assigned address to which retrieved electronic mail is to be transmitted only by a user at the fixed computer.

In another aspect of the present invention, the mail forwarding program is selectively switchable between first and second states, wherein in the first state the mail forwarding program is enabled to control the fixed computer to retrieve and transmit electronic mail to the assigned address, and wherein in the second state the mail forwarding program is disabled.

In another aspect of the present invention, the mail forwarding program is selectively switchable between its first and second states by a user at one of (a) the fixed computer and (b) the remote communicator via the router.

In still another aspect of the present invention, the mail forwarding program controls the fixed computer to transmit a notification signal via the router to the remote communicator indicating that electronic mail has been sent to the assigned address.

In yet another aspect of the present invention, the mail forwarding program controls the fixed computer to transmit the retrieved electronic mail to the assigned address and the notification signal to the remote communicator simultaneously.

It is an object of the present invention to provide a user remote from a private network access to his/her messaging services within the private network.

It is a further object of the present invention to provide a user such access while maintaining costs at a minimum.

It is a further object of the present invention to provide a user such access via a local telephone call.

It is still a further object of the present invention to provide a user remote from a private network notification that electronic mail resources addressed to the user have been received by the private network.

Other aspects, objects and advantages of the present invention can be obtained from a study of the application, the drawings, and the appended claims.

DESCRIPTION OF A TYPICAL ENVIRONMENT FOR USE OF THE INVENTION

Figure 1:
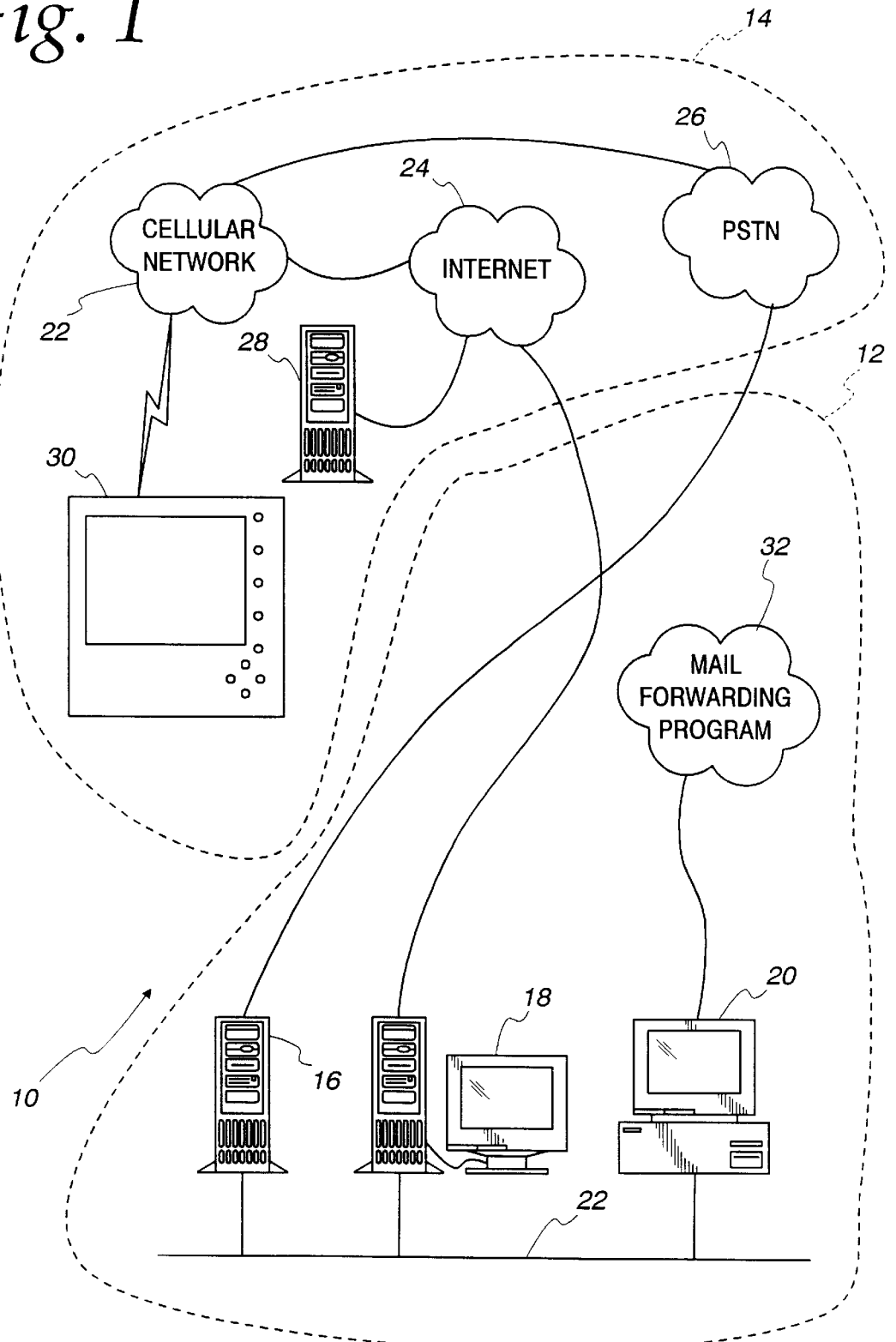
FIG. 1 is a diagram depicting a global network system within which the mail forwarding program of the present invention is used, the global network system including a private network and a public network.

A global network is depicted generally at 10 in FIG. 1. The illustrated global network 10 includes a private or corporate network 12 and a public network 14 external to the private network 12.

The private network 12 includes a private server 16, a firewall router 18 and a fixed computer 20, such as a PC or the like, all of which are interconnected via a data connection 22. It should be understood that the present invention contemplates multiple fixed computers 20 interconnected via the data connection 22, however, for convenience purposes only, one fixed computer 20 is depicted in FIG. 1.

Various individual public networks are depicted in FIG. 1 within the public network 14. These include a cellular network 22, the Internet 24 and a Public Switch Telephone Network ("PSTN") 26. For convenience, these systems will be referred to collectively as the public network 14. However, it should be understood that each individual network, in and of itself, may be considered a public network.

Also included in the public network 14, is a public mail server 28 and a portable personal communicator 30. The portable personal communicator 30 may be a laptop personal computer with a cellular modem, or simply a cell phone with enhanced intelligence and graphics. The remote communicator 30 is preferably a communicator having a display, a user controllable input device and a cellular modem, with editing and E-mail capabilities. The remote communicator 30 may also include a graphical user interface (GUI) for enhanced display and control capabilities. However, the present invention is by no means meant to be limited for use with such a communicator, and other communicators may be utilized with the present invention without departing from the spirit and scope thereof.

The private network 12 has the ability to: (1) receive and transmit E-mail messages internal to the private network 12; (2) transmit E-mail messages to the public network 14; and (3) receive E-mail messages from the public network 14.

The private server 16 controls the flow of E-mail messages within the private network 12. Operation of the private network 12 in transmitting and receiving internal E-mail messages is conventional and is as follows.

A person at the fixed computer 20 generates an E-mail message destined to another person within the private network 12. The E-mail message is transmitted to the private server 16 via the data connection 22, where it is stored at an address designated or assigned to the intended recipient. The intended recipient then need only send a request to the private server 16 to retrieve the E-mail.

In transmitting an E-mail message from within the private network 12 to a destination in the public network 14, a person at the fixed computer 20 generates a message destined to another person outside the private network 12. The E-mail message is then transmitted to the firewall router 18 via the data connection 22. The firewall router 18 is essentially the private network's 12 connection to the Internet 24.

The firewall router 18 is the centerpiece of the private network's 12 Internet security strategy. The firewall router 18 inspects all data coming in and out of the private network 12 using generally a stateful inspection technique that compares the data with the private network's 12 defined security profile to make sure that everything passing through is authorized. If the firewall router 18 determines that transmission of the message is authorized, the E-mail message is transmitted to the external destination via the Internet 24.

If an external E-mail message is destined to a person within the private network 12, the external E-mail message, upon entering the private network 12 through the Internet 24, is received by the firewall router 18. As previously noted, the firewall router 18 inspects the data to make sure that it is authorized. If the firewall router 18 determines that the incoming transmission is authorized, the external E-mail message is transmitted to the private server 16 via the data connection 22, where it is stored at an address designated or assigned to the intended recipient.

As is conventional, the firewall router 18 may be programmed to restrict message transmission by selected criteria, such as time of day, application, Internet site, bandwidth allowance, etc.

The fixed computer 20 can be conventionally configured to monitor the private server 16 for new E-mail and provide a notification indicator to the user at the fixed computer 20 if new E-mail has been received. Alternatively, the user, via the fixed computer 20, can directly check the private server 16 for new E-mail.

DESCRIPTION OF THE PRIOR ART

Figure 2:
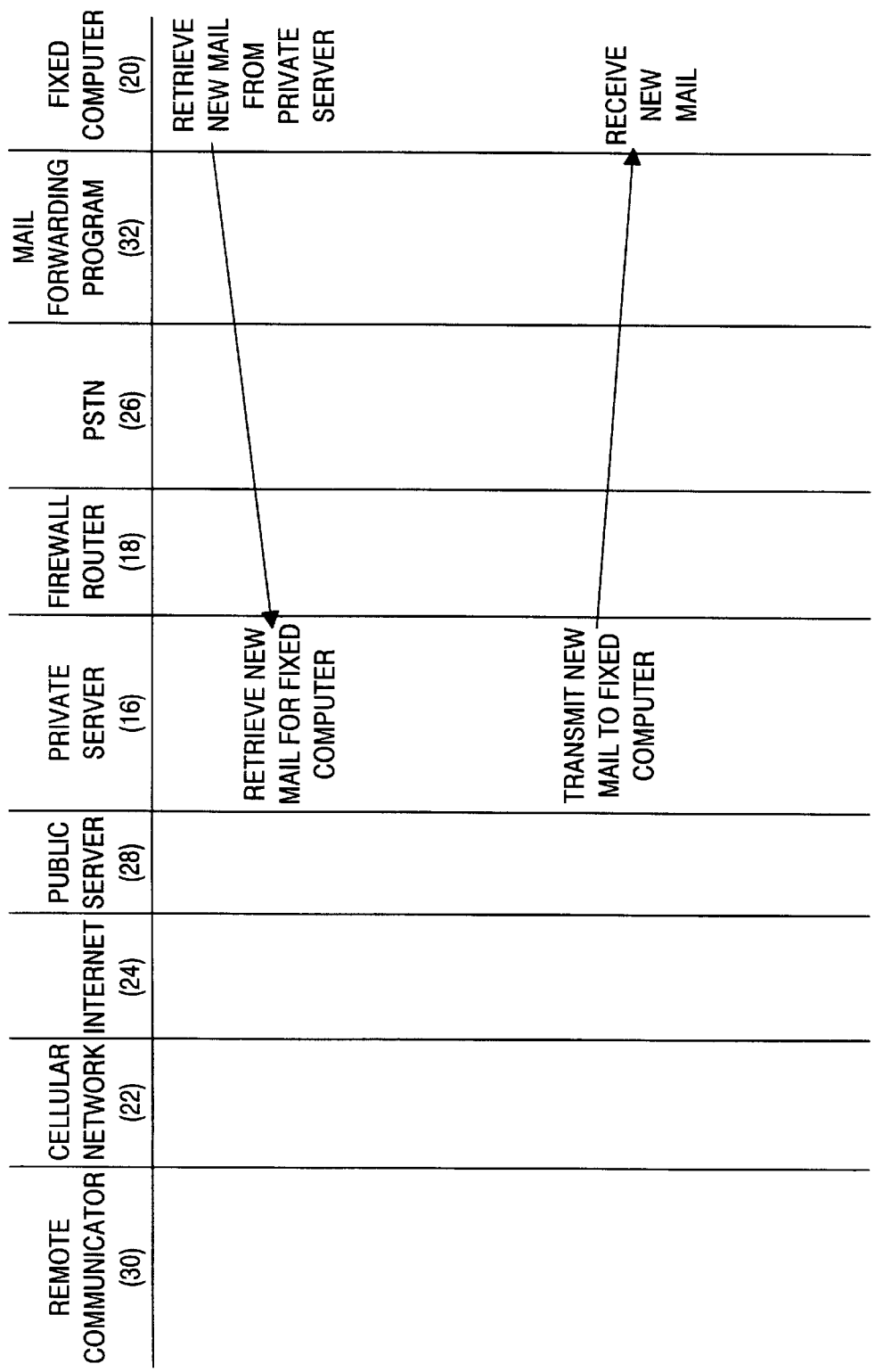
FIG. 2 is a process flow diagram illustrating the method by which a fixed computer in the private network retrieves E-mail from a private server also in the private network.

In either case, mail stored in the private server 16 may be retrieved by a user at the fixed computer 20 as illustrated in the process flow diagram of FIG. 2. The user inputs a command to the fixed computer 20 to retrieve the new mail from the private server 16. The fixed computer 20 accesses the private server 16 via the data connection 22 and orders the private server 16 to retrieve the new mail. The private server 16 retrieves the new mail and transmits the new mail back to the fixed computer 20 via the data connection 22 for viewing by the user at the fixed computer 20.

If, however, the user is not at the fixed computer 20 in the private network 12, accessing E-mail messages stored in the private server 16 becomes a bit more difficult. As previously mentioned in the Background of the Invention, there are generally two methods available for such a remote user to access E-mail messages stored in the private server 16.

Figure 3:
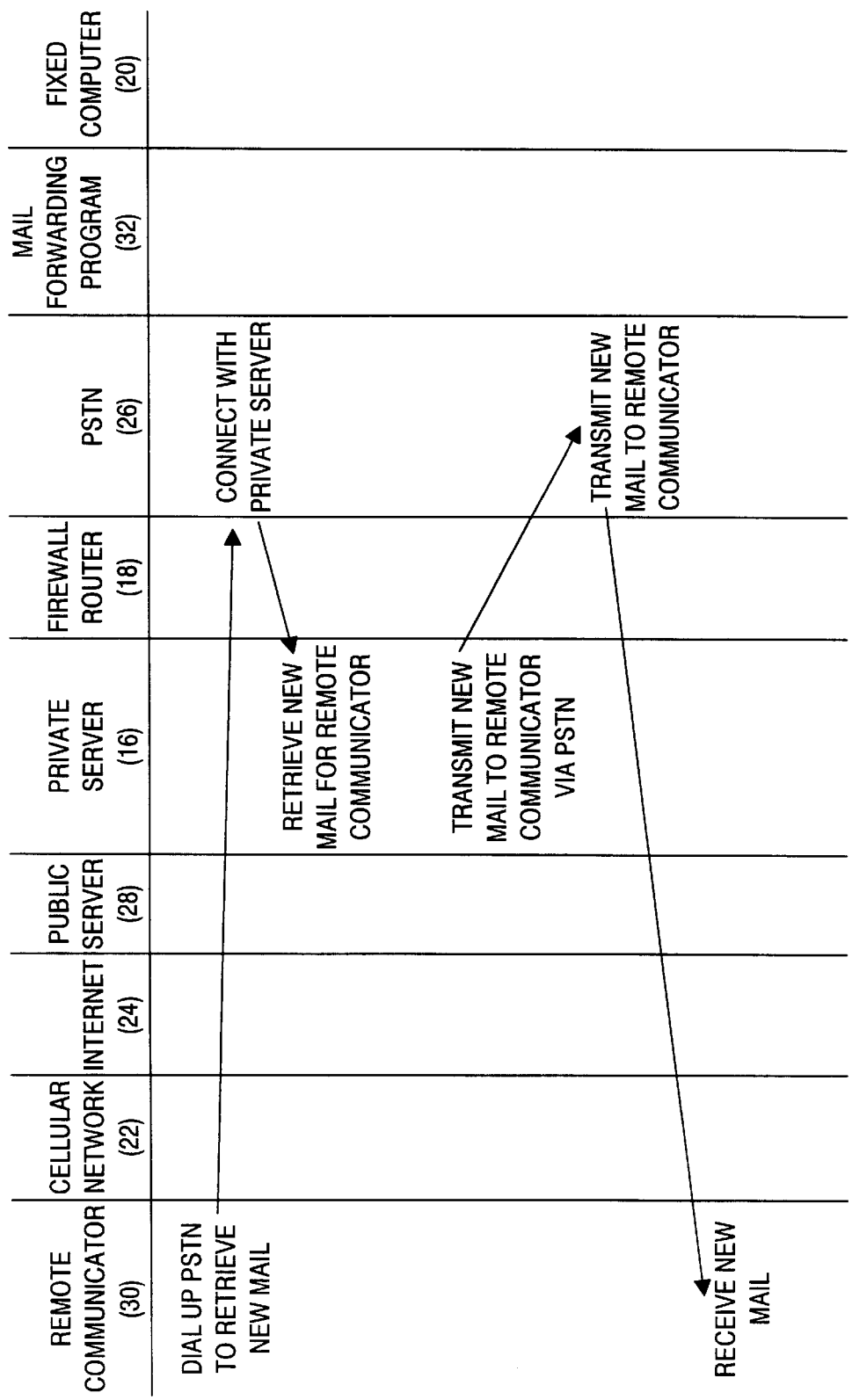
FIG. 3 is a process flow diagram illustrating one method of retrieving E-mail by a remote communicator in the public network from the private server.

Referring to the process flow diagram of FIG. 3, one method is to access the private server 16 through the PSTN 26. A remote user at the remote communicator 30 dials up the PSTN 26 through the cellular network 22 with a command to retrieve mail from the private server 16. The PSTN 26 connects directly to the private server 16, which then retrieves mail addressed to the remote user and transmits the mail to the remote user at the remote communicator 30 back through the PSTN 26. Accessing E-mail in this manner may require a long distance phone call, and generally requires a user to input a password or other security code in order to gain access to the private server 16. Further, encryption/decryption features may be utilized to provide additional protection of confidential information.

Figure 4:
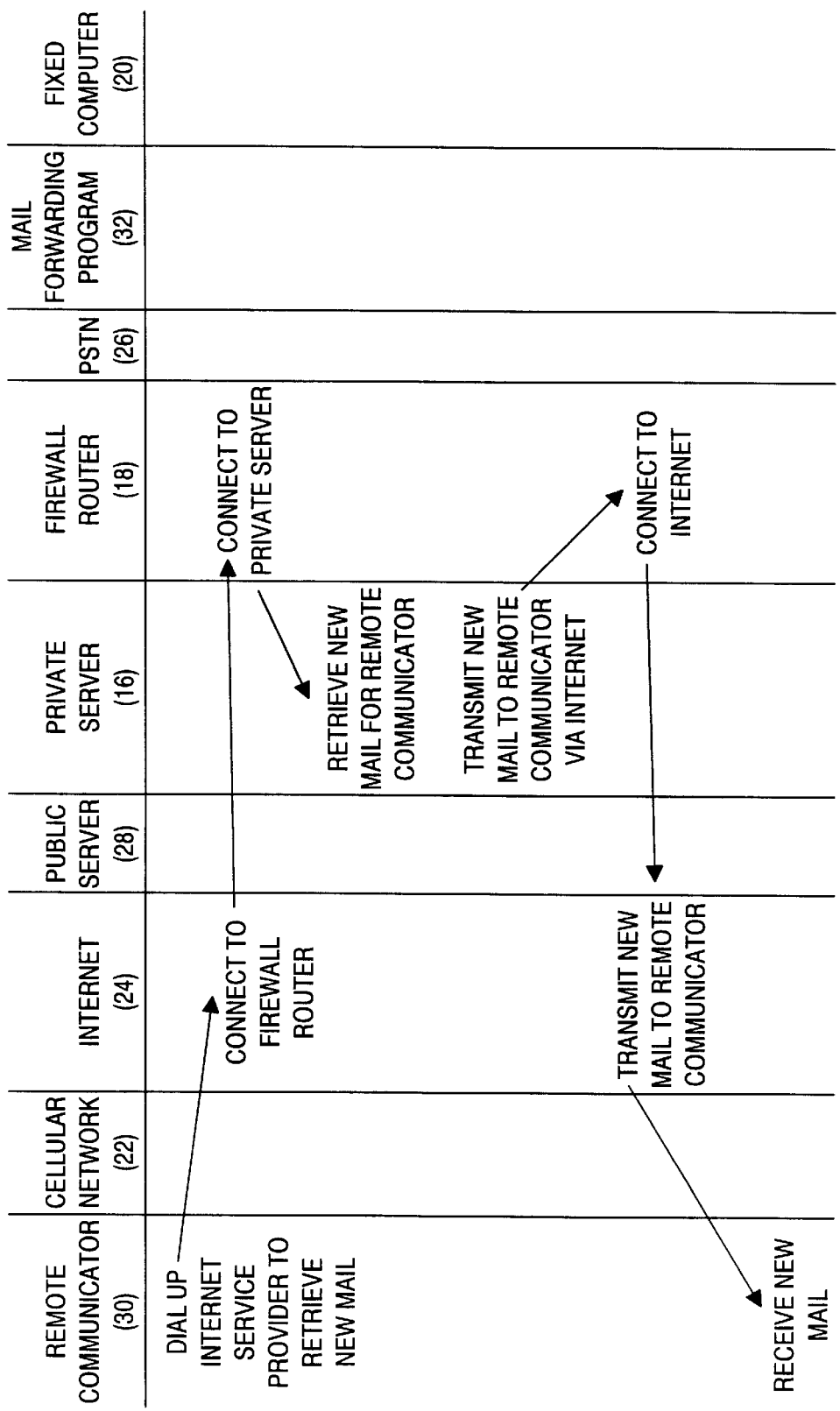
FIG. 4 is a process flow diagram illustrating an alternate method by which E-mail is retrieved by the remote communicator from the private server.

Referring now to the process flow diagram of FIG. 4, a second method is to access the private server 16 through the firewall router 18 via the Internet 24. The remote user at the remote communicator 30 dials up its Internet service provider 24 via the cellular network 22 with a command to retrieve mail from the private server 16. The Internet service provider 24 connects to the private server 16 in the private network 12 via the firewall router 18. If the firewall router 18 determines that the transmission is authorized, the private server 16 then retrieves mail addressed to the remote and transmits the retrieved mail to the remote user at the remote communicator 30 through the firewall router 18 and the Internet 24. This may expose the company or business to Internet fraud.

Problems arise when the remote communicator 30 is unable to access the private server 16 through the firewall router 18 via the Internet 24 due to restrictions placed on such connections by the private network 12. While the remote user could attempt to access the private server 16 via the PSTN 26, such a connection may require a long distance phone call increasing costs.

DESCRIPTION OF THE PREFERRED EMBODIMENT

This problem is avoided by providing a mail forwarding system for retrieving E-mail stored at the private server 16 in the private network system 12 by a remote communicator 30. As shown in FIG. 1, the mail forwarding system of the present invention includes a mail forwarding program 32 operating on the fixed computer 20.

The mail forwarding program 32 retrieves E-mail stored in the private server 16 and forwards it to a selected public mailbox address resident in the public server 28. The mail forwarding program 32 includes parameters and routines which can only be input and/or changed at the fixed computer 20. For instance, the preselected forwarding address in the public server 28 must be manually input by a user at the fixed computer 20 prior to departing.

The mail forwarding program 32 includes a timing routine permitting a user the flexibility of having mail forwarded only at a preselected time. The timing routine can only be enabled, and the preselected time set, manually by a user at the fixed computer 20.

The mail forwarding program 32 also includes a comparison routine permitting a user the flexibility of having only selected pieces of mail forwarded based on select criteria. Only retrieved mail meeting the select criteria is forwarded to the public server 28. The comparison routine can only be enabled, and the select criteria set, manually by a user at the fixed computer 20. Such select criteria may include forwarding only messages received form certain individuals, messages received on a certain topic, messages received on a certain billing number, etc.

The mail forwarding program 32 may be activated/enabled either by a user at the remote communicator 30 or at the fixed computer 20. Further, deactivation/disablement of the mail forwarding program 32 may also be accomplished by a user either at the remote communicator 30 or at the fixed computer 20.

Figure 5:
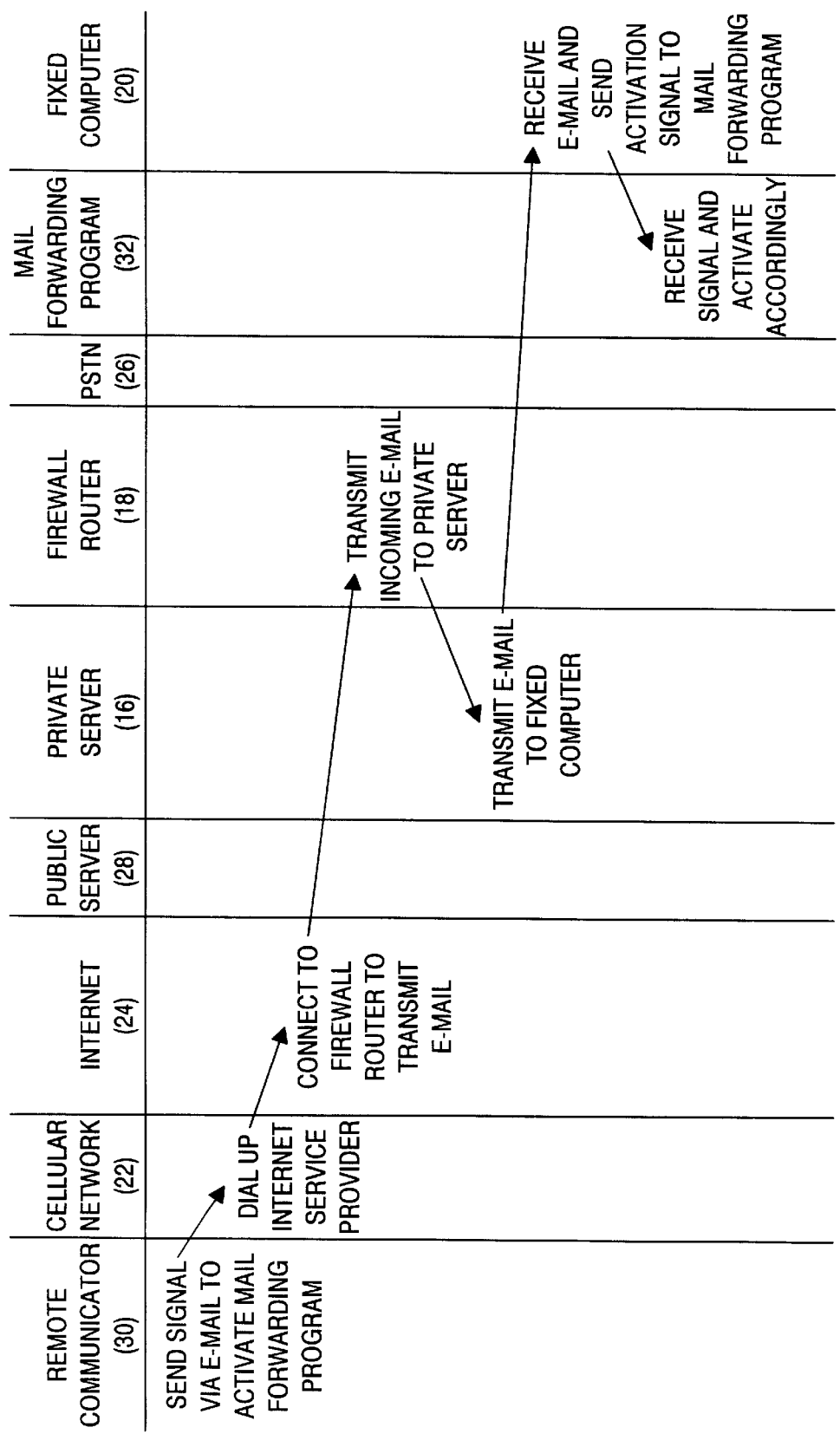
FIG. 5 is a process flow diagram illustrating activation of the mail forwarding program from the remote communicator.

Activation of the mail forwarding program 32 via the remote resource 30 is illustrated in the process flow diagram of FIG. 5. More specifically, a user at the remote resource 30 sends a command, as an E-mail message, on the cellular network 22 to activate the mail forwarding program 32 on the fixed computer 20. The user's cellular network 22 then dials up the Internet service provider 24 which connects to the firewall router 18 to send the E-mail message. The firewall router 18 sends the incoming E-mail to the private server 16, which in turn sends the E-mail to the fixed computer 20. The fixed computer 20 receives the E-mail message and enables the mail forwarding program 32 to forward mail from the private server 16.

Figure 6:
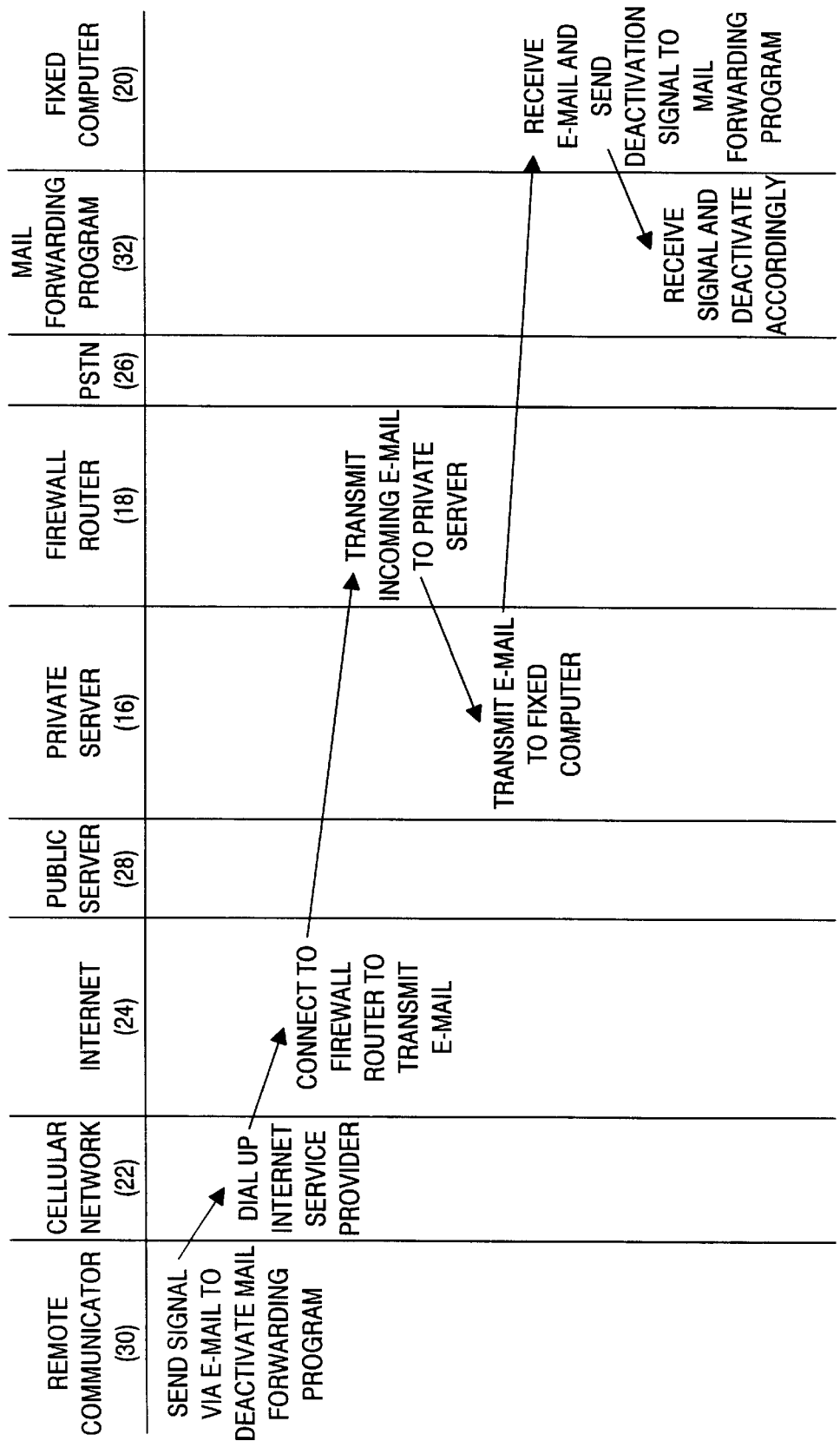
FIG. 6 is a process flow diagram illustrating deactivation of the mail forwarding program from the remote communicator.

Deactivation of the mail forwarding program 32 via the remote communicator 30, as illustrated in the process flow diagram of FIG. 6, occurs in substantially the same manner. The only difference being that the user sends a command to deactivate the mail forwarding program 32 on the fixed computer 20. Upon receipt of the deactivation command, the fixed computer 20 disables the mail forwarding program 32 and ceases to forward mail from the private server 16.

Figure 7:
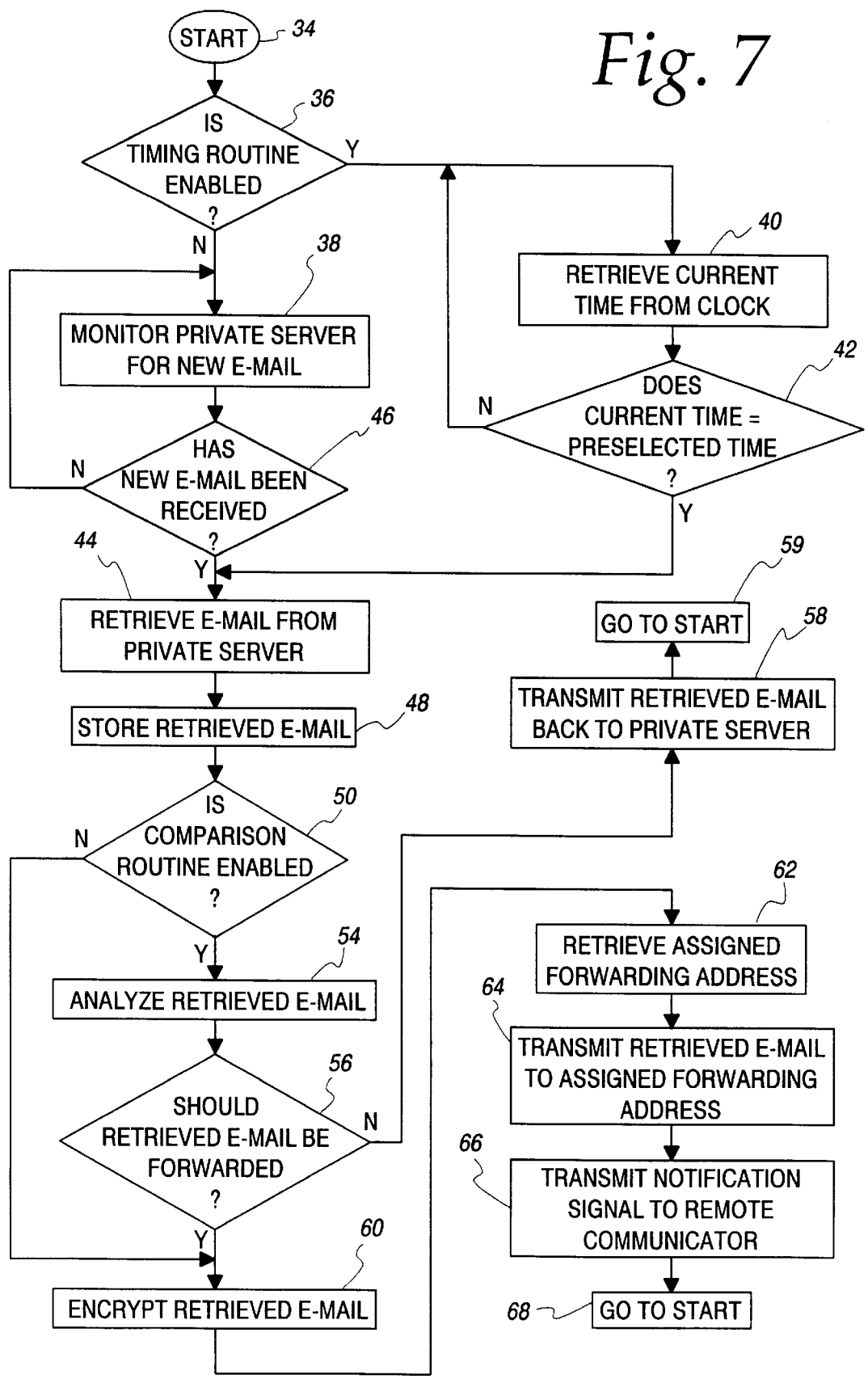
FIG. 7 is a flow chart illustrating the operation of the mail forwarding program of the present invention.

The basic operation of the inventive mail forwarding program 32 will now be described with reference to the flow chart of FIG. 7. Once the mail forwarding program 32 has been enabled, either by a user at the fixed computer 20 or by a user at the remote communicator 30, the mail forwarding program 32 undergoes a start routine, block 34, based upon stored program control instructions stored in a memory device.

The mail forwarding program 32 initially determines if the timing routine has been enabled, block 36. If the timing routine has been enabled at block 36, the fixed computer 20 retrieves the current time from an internal clock, block 40, and then determines if the current time is equal to a preselected set time, block 42. If the current time does not equal the preselected time, the routine returns back to block 40 and proceeds in a continuous loop. When the current time equals the preselected time, block 42, the fixed computer 20 sends a request to the private server 16 to retrieve E-mail from the private server 16, block 44.

If the timing routine has not been enabled at the block 36, the mail forwarding program 32 controls the fixed computer 20 to conventionally monitor the private server 16 for new E-mail messages, block 38. Generally, the routine uses a Post Office Protocol, such as, but not limited to, POP3, to monitor for new mail. The fixed computer 20 continues to monitor for new E-mail, blocks 46 and 38, until such E-mail is received.

Once block 46 determines that E-mail is received at the private server 16, block 44 again causes the fixed computer 20 to send a request to the private server 16 to retrieve the E-mail. The fixed computer 20 stores the retrieved E-mail in a messaging engine, block 48, and then determines if the comparison routine has been enabled, block 50. The comparison routine permits a user to forward only select pieces of mail.

If the comparison routine has been enabled, the fixed computer 20 analyzes the retrieved E-mail, block 54, and determines whether the retrieved E-mail should be forwarded based on certain select criteria which have been input into the mail forwarding program 32, block 56.

If the retrieved E-mail does not meet the certain select criteria, the retrieved E-mail can be transmitted back to the private server 16, block 58, and the start routine 34 begins again, block 59.

If the retrieved E-mail meets the certain select criteria at block 56, or if block 50 determines that the comparison routine has not been enabled, the retrieved E-mail is encrypted, if necessary, at block 60. After the retrieved E-mail is encrypted, the assigned forwarding address is retrieved, block 62. The encrypted E-mail is transmitted to the assigned forwarding address, block 64, and an SMS or pager notification signal is transmitted to the remote communicator 30, block 66, indicating that E-mail has been stored at the assigned forwarding address. The notification signal may transmitted subsequent to or simultaneously with the transmission of the E-mail to the assigned forwarding address. After transmitting the notification signal, the start routine 34 beings again, block 68.

Once the notification signal is received at the remote communicator 30, a remote user can access the assigned address at the public server 28 by making a local phone call through the cellular network 22 to the Internet service provider 24. The user at the remote communicator 30 can then retrieve and view the E-mail from the public mail server 28 without having to make a long distance phone call to gain access to the private network 12. The user at the remote communicator 30 may utilize protocols such as POP3 or IMAP4 to retrieve the mail from the public server 28. However, the present invention is by no means meant to be limited to such protocols.

By sending a notification signal to the remote communicator 30, a remote user is now aware that E-mail has been received and transmitted to the forwarding address, and does not have to periodically check the private server 16 to see if E-mail has been received. This saves both the user and his/her business concern time and money.

While the invention has been described with particular reference to the drawings, it should be understood that various modifications can be made without departing from the spirit and scope of the present invention. For example, E-mail may also include fax mail, voice mail or video mail, and other wireless access could be used, such as RAM, Ardis, CDPD, etc.

What is claimed is:

1. In a private network having a server, a fixed computer and a router for connection to a public network external to the private network, all interconnected via a data connection, the server controlling electronic mail resources addressed to a user of the fixed computer received by the private network, a mail forwarding system comprising:

a mail forwarding program operating in the fixed computer for controlling the fixed computer to selectively and automatically, without user intervention, (a) retrieve electronic mail resources addressed to the user of the fixed computer from the private network and (b) transmit the retrieved electronic mail resources via the router to an assigned address in the public network accessible by a communicator remote from the private network.

2. The mail forwarding system of claim 1, wherein said mail forwarding program controls the fixed computer to automatically, without user intervention, transmit only selected pieces of electronic mail to the assigned address.

3. The mail forwarding system of claim 2, wherein said mail forwarding program controls the fixed computer to automatically, without user intervention, determine whether the retrieved electronic mail is a selected piece of electronic mail, and wherein if the retrieved electronic mail is a selected piece, the fixed computer transmits the retrieved electronic mail to the assigned address via the router, and wherein if the retrieved electronic mail is not a selected piece, the fixed computer transmits the retrieved electronic mail back to the server via the data connection.

4. The mail forwarding system of claim 1, wherein said mail forwarding program includes a comparison routine for controlling the fixed computer to automatically, without user intervention, transmit only selected pieces of electronic mail meeting certain select criteria, and wherein the comparison routine is accessible only by a user at the fixed computer to input or change the certain select criteria.

5. The mail forwarding system of claim 1, wherein said mail forwarding program controls the fixed computer to automatically, without user intervention, retrieve and transmit electronic mail at a preselected time.

6. The mail forwarding system of claim 1, wherein said mail forwarding program includes a timing routine for controlling the fixed computer to automatically, without user intervention, retrieve and transmit electronic mail at a preselected time, and wherein the timing routine is accessible only by a user at the fixed computer to input or change the preselected time.

7. The mail forwarding system of claim 1, wherein the fixed computer encrypts the retrieved electronic mail prior to transmitting it to the assigned address.

8. The mail forwarding system of claim 1, wherein the assigned address in the public network can be set and/or changed only by a user at the fixed computer.

9. The mail forwarding system of claim 1, wherein said mail forwarding program includes an address programming routine, and wherein the address programming routine is accessible only by a user at the fixed computer to input or change the assigned address.

10. The mail forwarding system of claim 1, wherein said mail forwarding program is selectively switchable between first and second states, wherein in the first state the mail forwarding program is enabled to control the fixed computer to automatically, without user intervention, retrieve and transmit electronic mail, and wherein in the second state the mail forwarding program is disabled.

11. The mail forwarding system of claim 10, wherein said mail forwarding program is selectively switchable between its first and second states by a user at one of (a) the one fixed computer and (b) the remote communicator via the router.

12. The mail forwarding system of claim 1, wherein said mail forwarding program controls the fixed computer to automatically, without user intervention, transmit a notification signal via the router to the remote communicator indicating that electronic mail has been sent to the assigned address.

13. The mail forwarding system of claim 12, wherein the fixed computer transmits the retrieved electronic mail to the assigned address and the notification signal to the remote communicator simultaneously.

14. In a private network having a server, a fixed computer and a router for connection to a public network external to the private network, all interconnected via a data connection, the server controlling electronic mail resources addressed to a user of the fixed computer received by the private network, a method of automatically forwarding electronic mail received by the private network to an assigned address in the public network accessible by a communicator remote to the private network, said method comprising the steps of:

controlling the fixed computer to automatically, without user intervention:

poll the server for electronic mail received by the server and addressed to a user of the fixed computer;

retrieve the electronic mail addressed to the user of the fixed computer from the server; and transmit the retrieved electronic mail via the router to an assigned address in the public network accessible by a communicator remote from the private network.

15. The method of claim 14, further including the step of controlling the fixed computer to encrypt the retrieved electronic mail prior to transmitting the retrieved electronic mail to the assigned address.

16. The method of claim 14, further including the steps of:

designating at the fixed computer certain criteria defining selected pieces of electronic mail; and controlling the fixed computer to automatically, without user intervention, transmit only the selected pieces of electronic mail to the assigned address.

17. The method of claim 16, further including the step of controlling the fixed computer to automatically, without user intervention:

determine whether the retrieved electronic mail meets the designated certain criteria;

transmit the retrieved electronic mail meeting the designated certain criteria to the assigned address via the router; and transmitting the retrieved electronic mail not meeting the designated certain criteria back to the server via the data connection.

18. The method of claim 14, further including the step of controlling the fixed computer to automatically, without user intervention, retrieve and transmit electronic mail at a preselected time.

* * * * *